(12) United States Patent
Kuo

(10) Patent No.: US 9,547,149 B2
(45) Date of Patent: Jan. 17, 2017

(54) ASSEMBLING DEVICE FOR GUIDE POLE OF CAMERA ACTUATOR

(71) Applicant: HON HAI PRECISION INDUSTRY CO., LTD., New Taipei (TW)

(72) Inventor: Chang-Wei Kuo, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 804 days.

(21) Appl. No.: 13/971,860

(22) Filed: Aug. 21, 2013

(65) Prior Publication Data

US 2014/0199059 A1 Jul. 17, 2014

(30) Foreign Application Priority Data

Jan. 17, 2013 (TW) .............................. 102101849 U

(51) Int. Cl.
H01L 21/683 (2006.01)
G02B 7/10 (2006.01)
G03B 3/10 (2006.01)

(52) U.S. Cl.
CPC . *G02B 7/10* (2013.01); *G03B 3/10* (2013.01); *G03B 2205/0053* (2013.01)

(58) Field of Classification Search
CPC ...... B25B 11/002; B25B 11/005; B25B 11/02; B25B 13/44
See application file for complete search history.

(56) References Cited

U.S. PATENT DOCUMENTS

| | | | | |
|---|---|---|---|---|
| 4,288,065 A | * | 9/1981 | Braverman | B65D 73/0064 269/287 |
| 7,028,999 B2 | * | 4/2006 | Sunadome | B23Q 16/001 269/47 |
| 8,511,663 B2 | * | 8/2013 | Gong | G06F 1/1637 269/16 |
| 2013/0298382 A1 | * | 11/2013 | Yamashita | H05K 13/0061 29/559 |
| 2014/0199059 A1 | * | 7/2014 | Kuo | G02B 7/10 396/428 |

* cited by examiner

*Primary Examiner* — Lee D Wilson
(74) *Attorney, Agent, or Firm* — Zhigang Ma

(57) ABSTRACT

An assembling device for a guide pole of a camera actuator includes: a pedestal, a frame, a plurality of guide pole receiving units and a cover. The pedestal includes a first surface and a second surface opposite to the first surface, the first surface defines a plurality of first receiving holes, each the first receiving hole arranged with a magnet, the second surface defines a plurality of first bump. The frame locates on the second surface and defines a plurality of through holes. Each guide pole receiving unit defines a second receiving hole configuring for receiving a guide pole, each guide pole receiving unit is received in each through hole and locating on the first bump. The cover locates on the frame and comprises a top surface and a bottom surface, the top surface defines a plurality of dispensing holes, the dispensing hole extends through the cover.

12 Claims, 10 Drawing Sheets

ASSEMBLING DEVICE FOR GUIDE POLE OF CAMERA ACTUATOR

BACKGROUND

1. Technical Field

The present disclosure relates to assembling devices for guide poles of camera actuators.

2. Description of Related Art

Camera actuators are used for auto-focus functions. A camera actuator includes a guide pole, an image sensor plate and a moveable carrier defining a bushing hole. One end of the guide pole fits with the image sensor plate and the other end of the guide pole extends through the bushing hole and moves lenses along an optical axis of a camera to realize the auto-focus function. The thickness of the image sensor plate is only several micrometers, and the guide pole is very slender, so the guide pole is easy tilt relative to the image sensor plate during an assembling process. This affects the auto-focus function.

Therefore, it is desirable to provide a assembling device which can overcome or at least alleviated the above mentioned problems.

DETAILED DESCRIPTION

Figure 1:
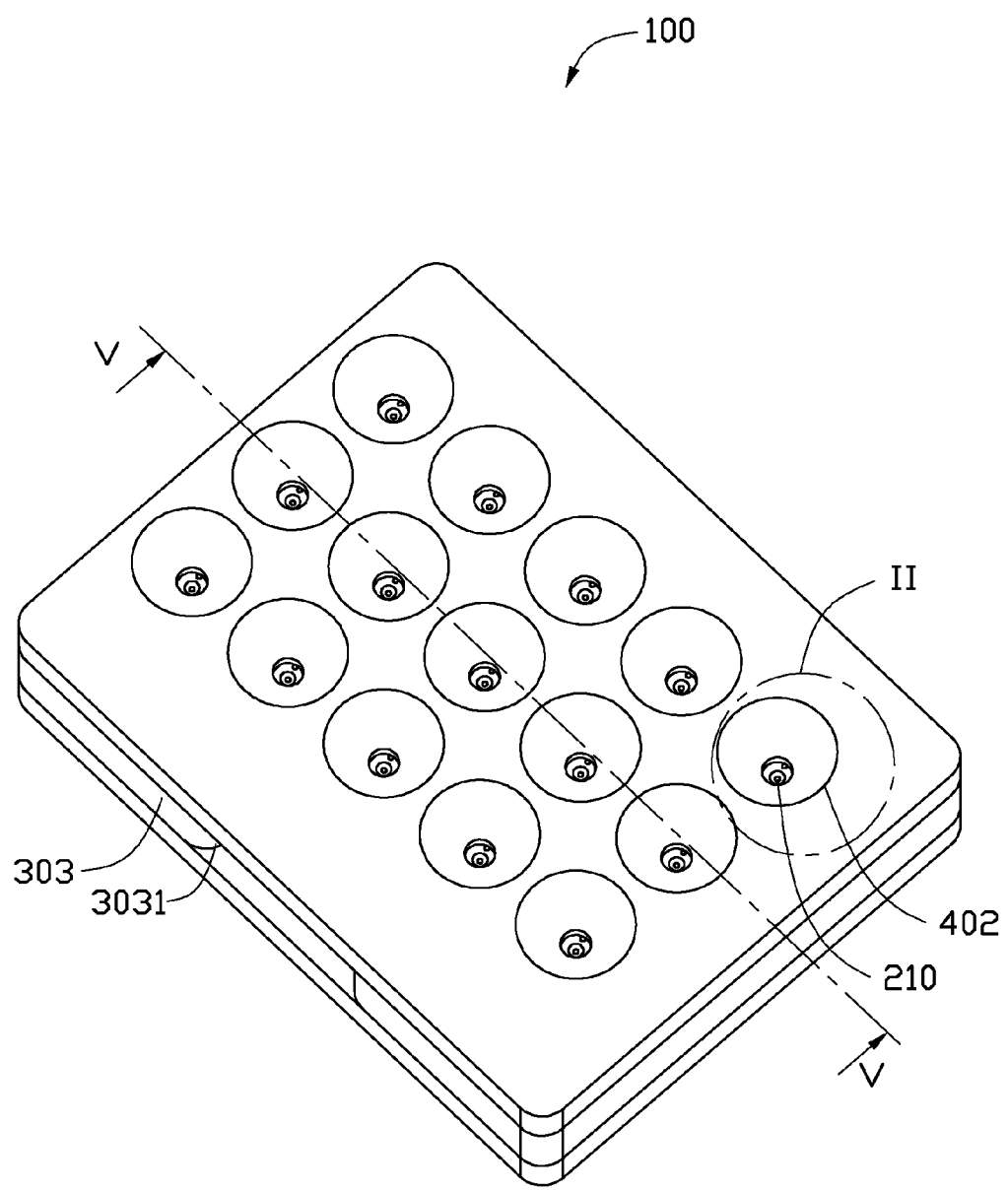
FIG. 1 is a schematic, isometric view of a assembling device according to an exemplary embodiment.
Figure 2:
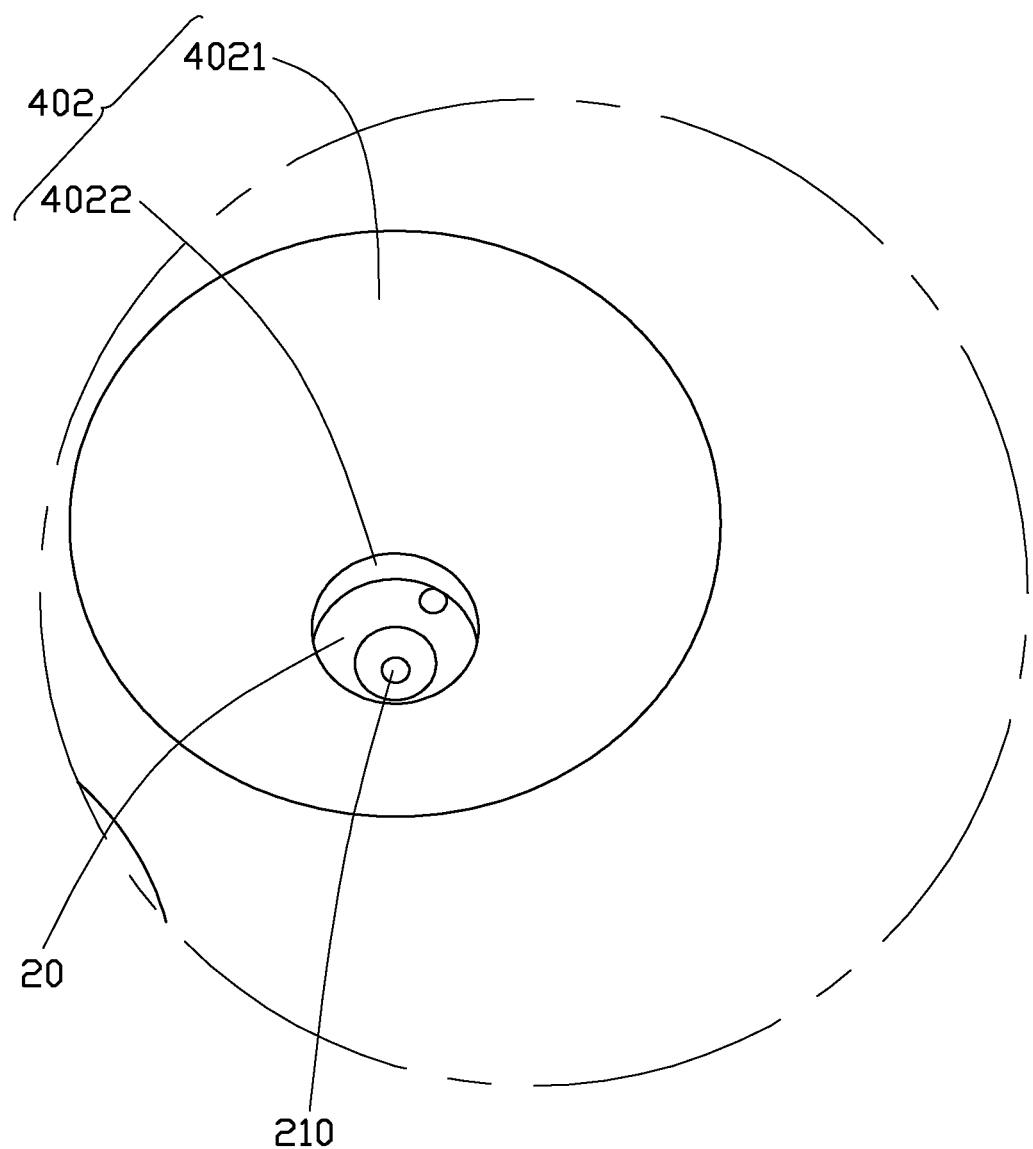
FIG. 2 is an enlarged view of a circled part II of FIG. 1.
Figure 3:
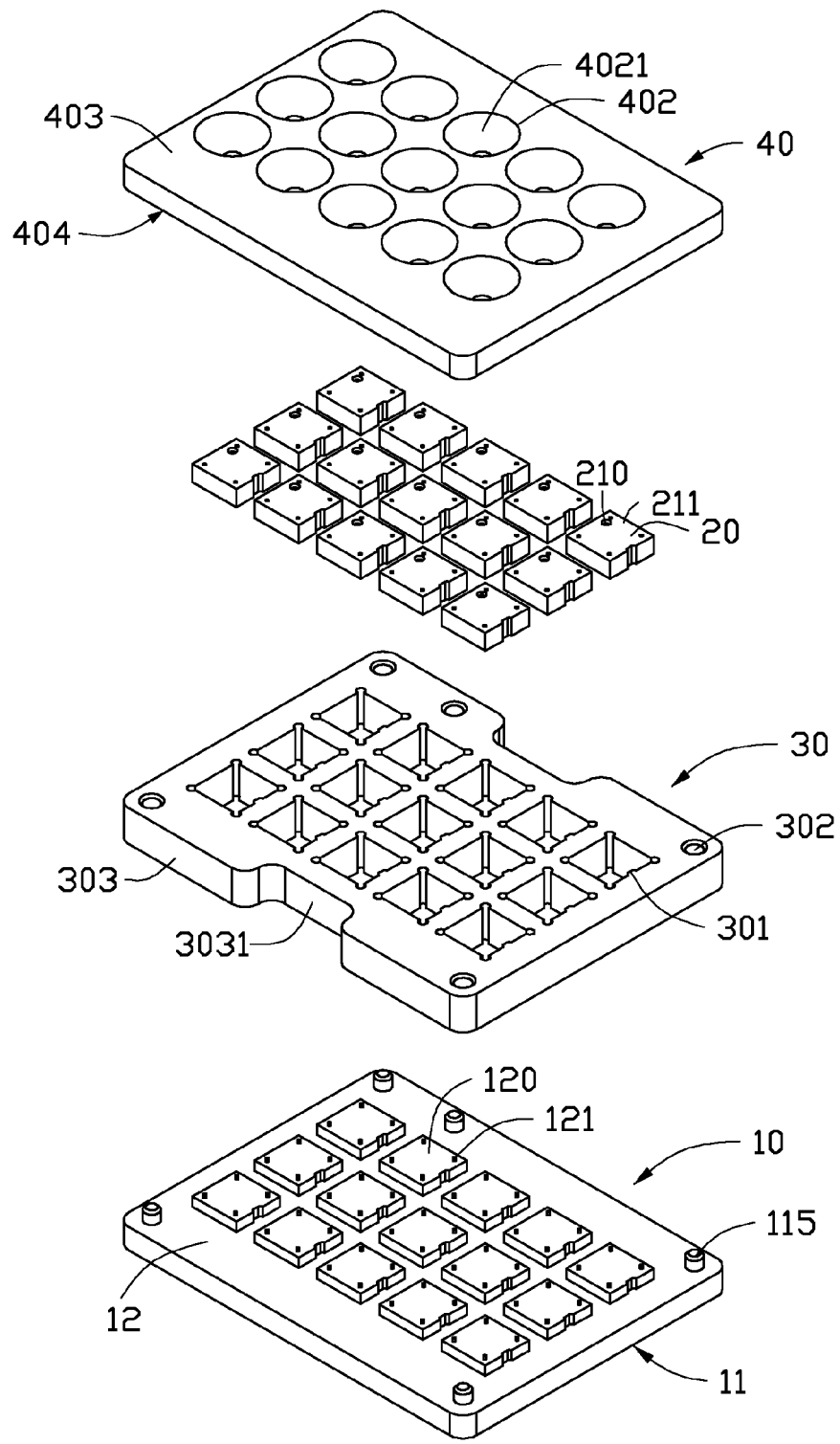
FIG. 3 is an exploded view of the assembling device of FIG. 1.
Figure 4:
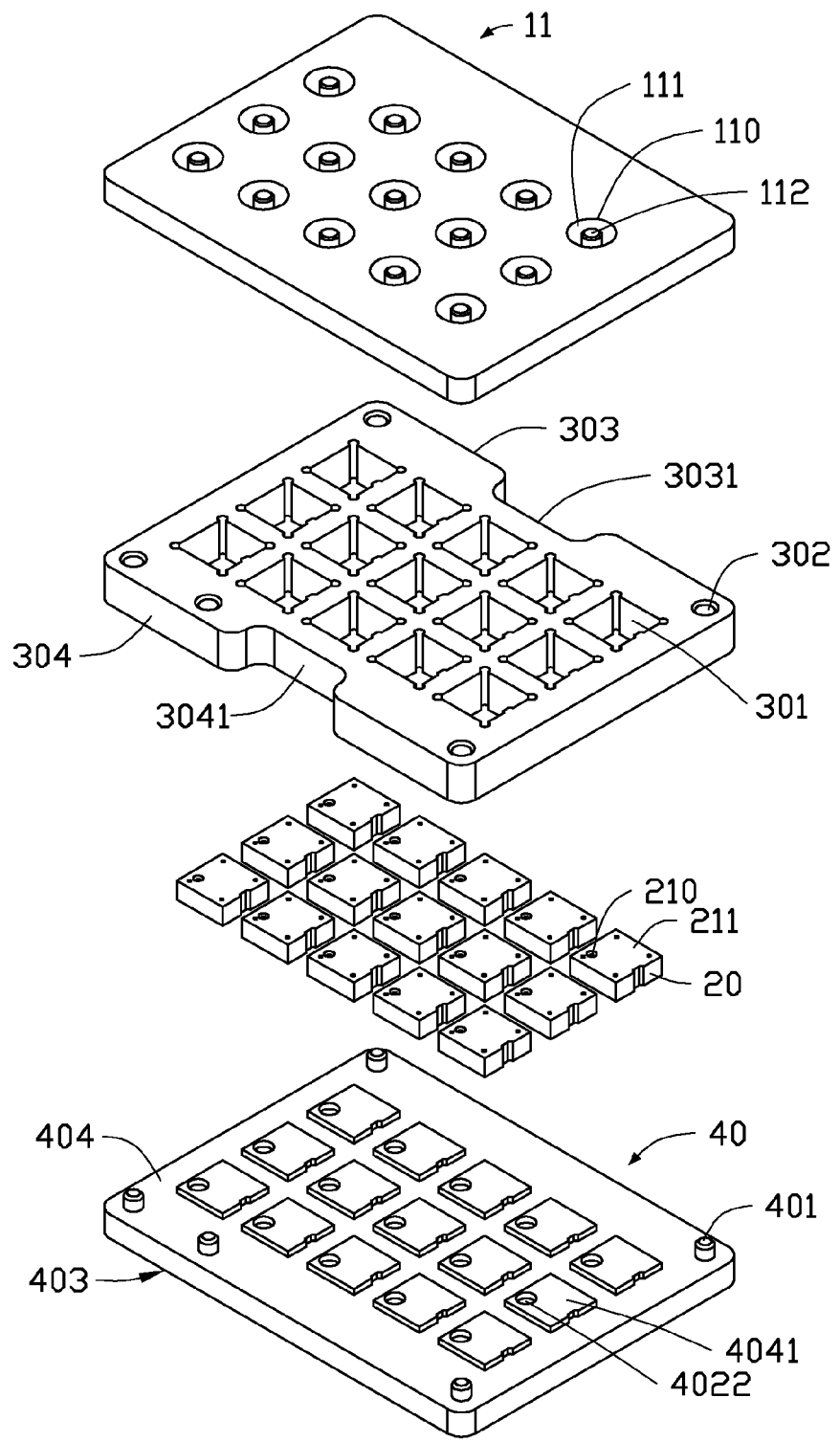
FIG. 4 is similar to FIG. 3, but viewed from another direction.
Figure 5:
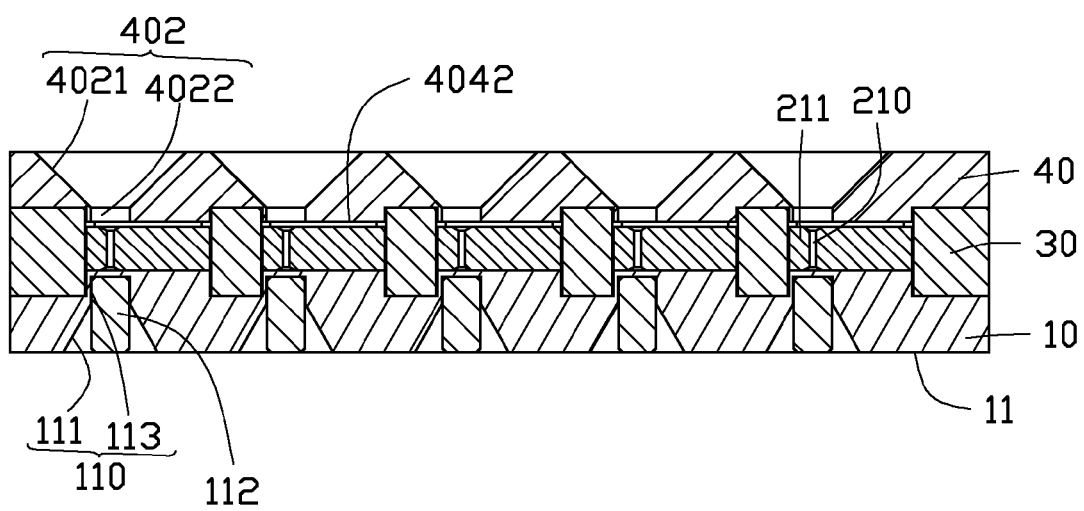
FIG. 5 is a cross sectional view taking along line V-V of the assembling device of FIG. 1.
Figure 6:
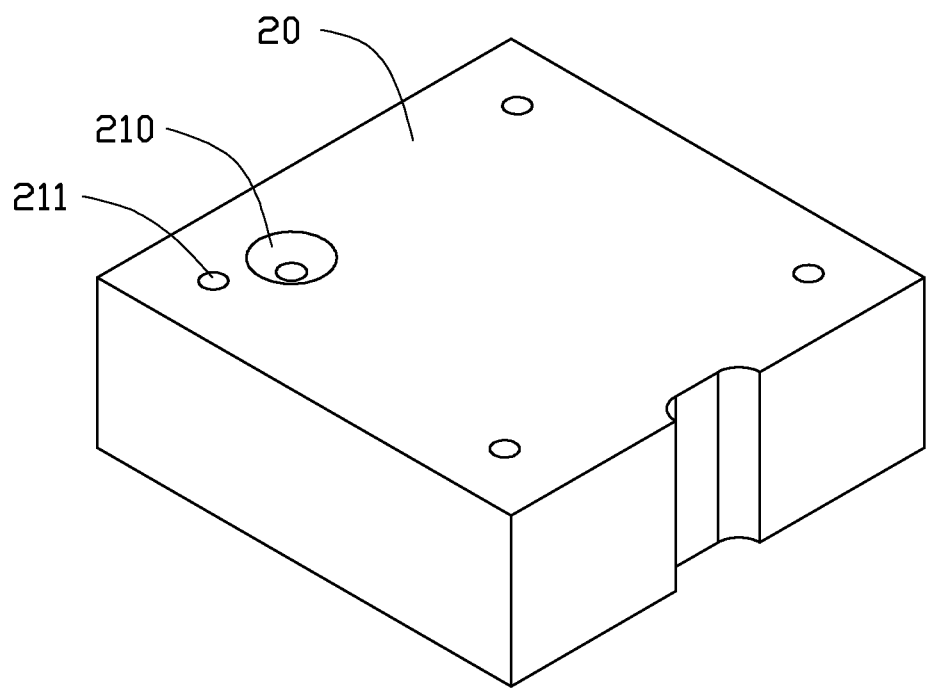
FIG. 6 is a schematic, isometric view of a guide pole receiving unit of FIG. 1.

FIGS. 1-6 show an assembling device 100 for a guide pole of a camera actuator according to an exemplary embodiment. The assembling device 100 includes a pedestal 10, a number of guide pole receiving units 20, a frame 30 and a cover 40. The pedestal 10, the guide pole receiving units 20, the frame 30 and the cover 40 are substantially cuboids.

The pedestal 10 includes a first surface 11 and a second surface 12 opposite to the first surface 11. The first surface 11 defines a number of first receiving holes 110. The first receiving hole 110 is a blind hole and includes a first cylindrical portion 113 and a first conical opening 111 connected with the first cylindrical bottom portion 113. The aperture of the first conical opening 111 gradually decreases from the first surface 11 to the second surface 12.

A magnet 112 is received in each of the first receiving holes 110. The magnet 112 is rod-shaped and a diameter of the magnet 112 is slightly less than a minimum diameter of the first receiving hole 110. The magnet 112 is fixed in the first receiving hole 110 by glue or adhesive. The second surface 12 has a number of first bumps 120. The first bump 120 spatially corresponds with the respective first receiving hole 110 and the first cylindrical portion 113 is aligned with the center of the first bump 120.

The frame 30 is mounted on the second surface 12. The frame 30 defines a number of through holes 301. Each through hole 301 spatially corresponds to the first bump 120 and the first bump 120 is received in the corresponding through hole 301. The frame 30 includes a first side surface 303 and a second side surface 304 opposite to the first side surface 303. The first side surface 303 defines a first recess 3031 and the second side surface 304 defines a second recess 3041 corresponding to the first recess 3031. The first recess 3031 and the second recess 3041 are configured for easily separating the cover 40 and the frame 30.

The second surface 12 of the pedestal 10 further defines five first fixing poles 115 at the edge of the second surface 12. The frame 30 defines a number of first fixing holes 302 surrounding the through hole 301. The frame 30 is fixed with the pedestal 10 through engaging the first fixing pole 115 in the first fixing hole 302.

Figure 7:
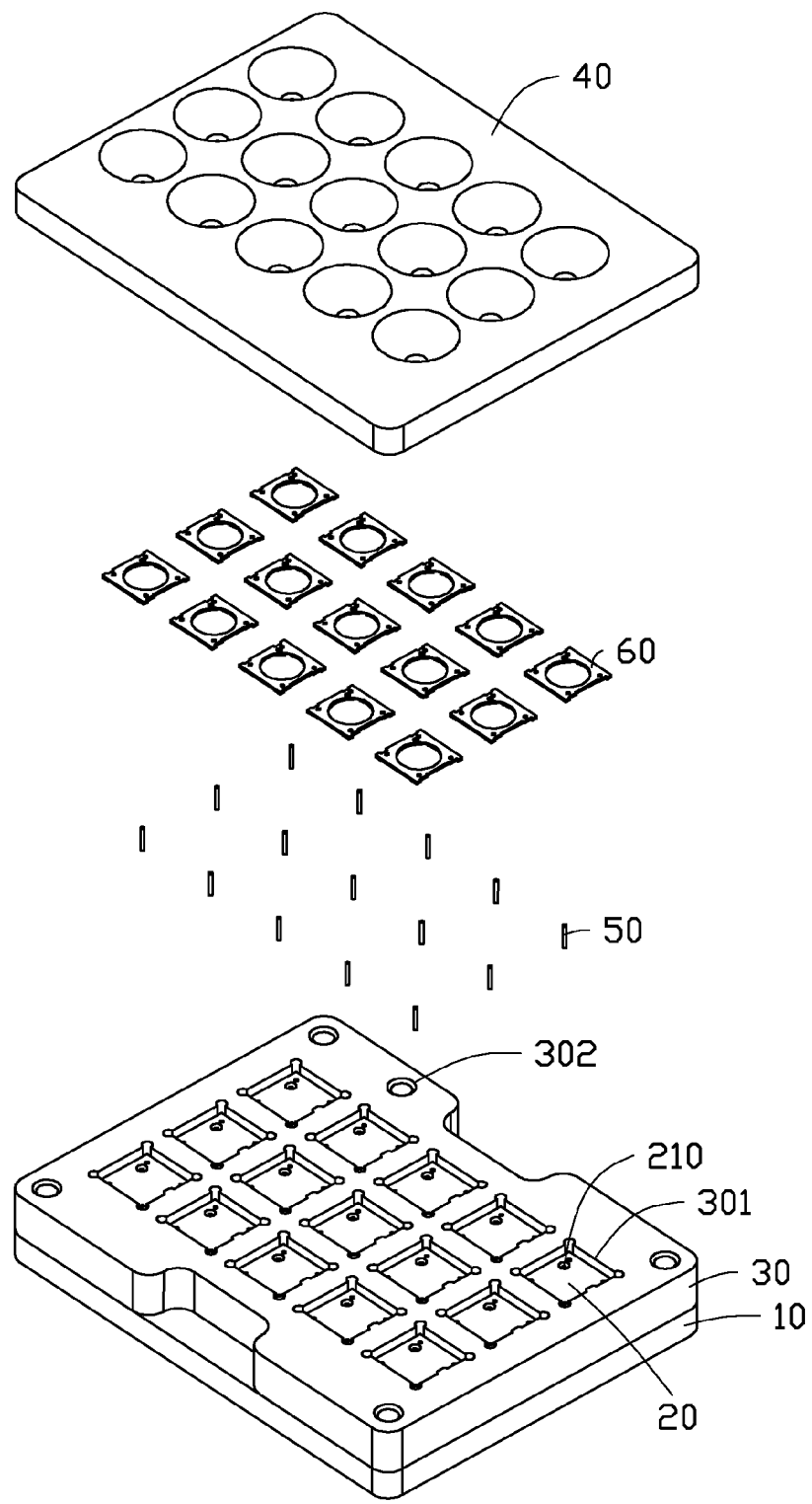
FIG. 7 is a schematic view showing an assembling stage of the assembling device of FIG. 1 in a first state.
Figure 8:
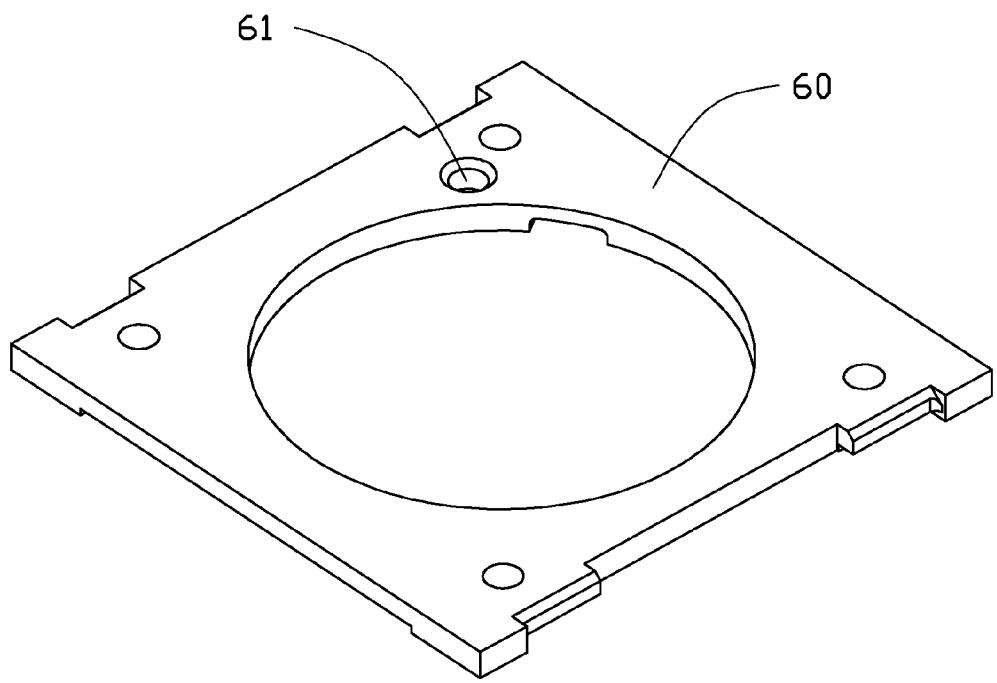
FIG. 8 is a schematic view of an image sensor plate of a camera actuator used in the assembling stage.
Figure 9:
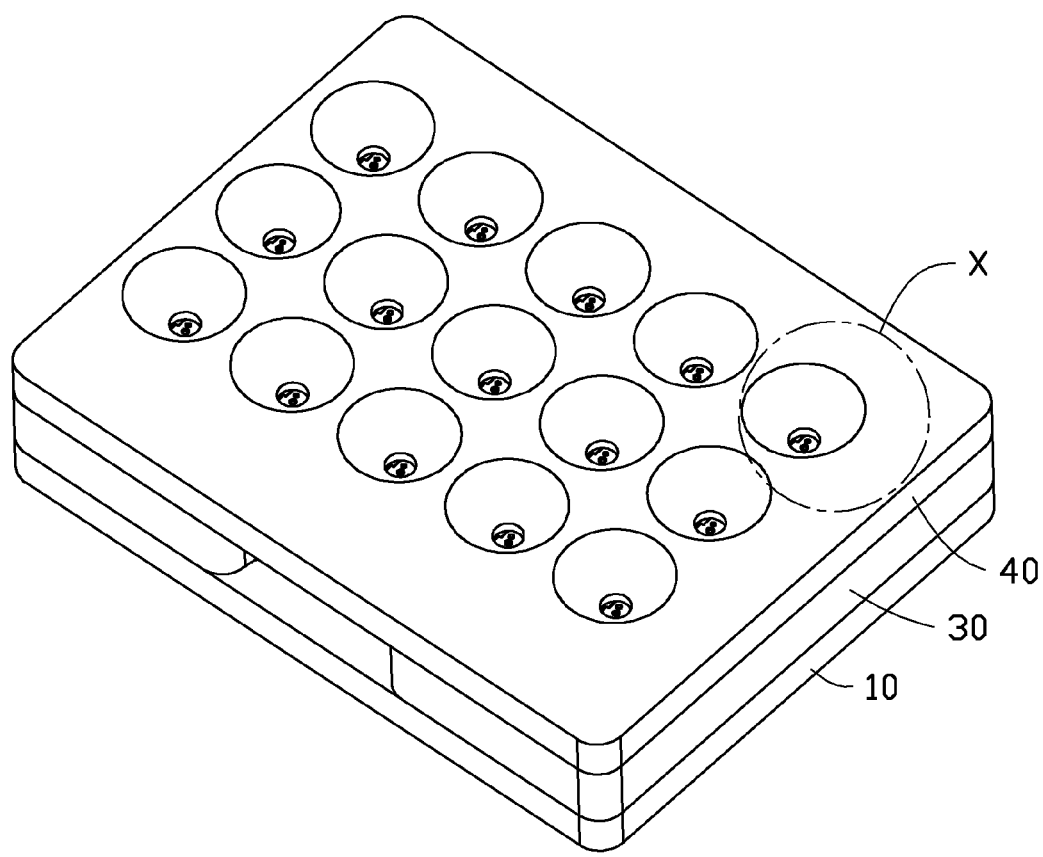
FIG. 9 is a schematic view showing the assembling stage of the assembling device of FIG. 1 in a second state.
Figure 10:
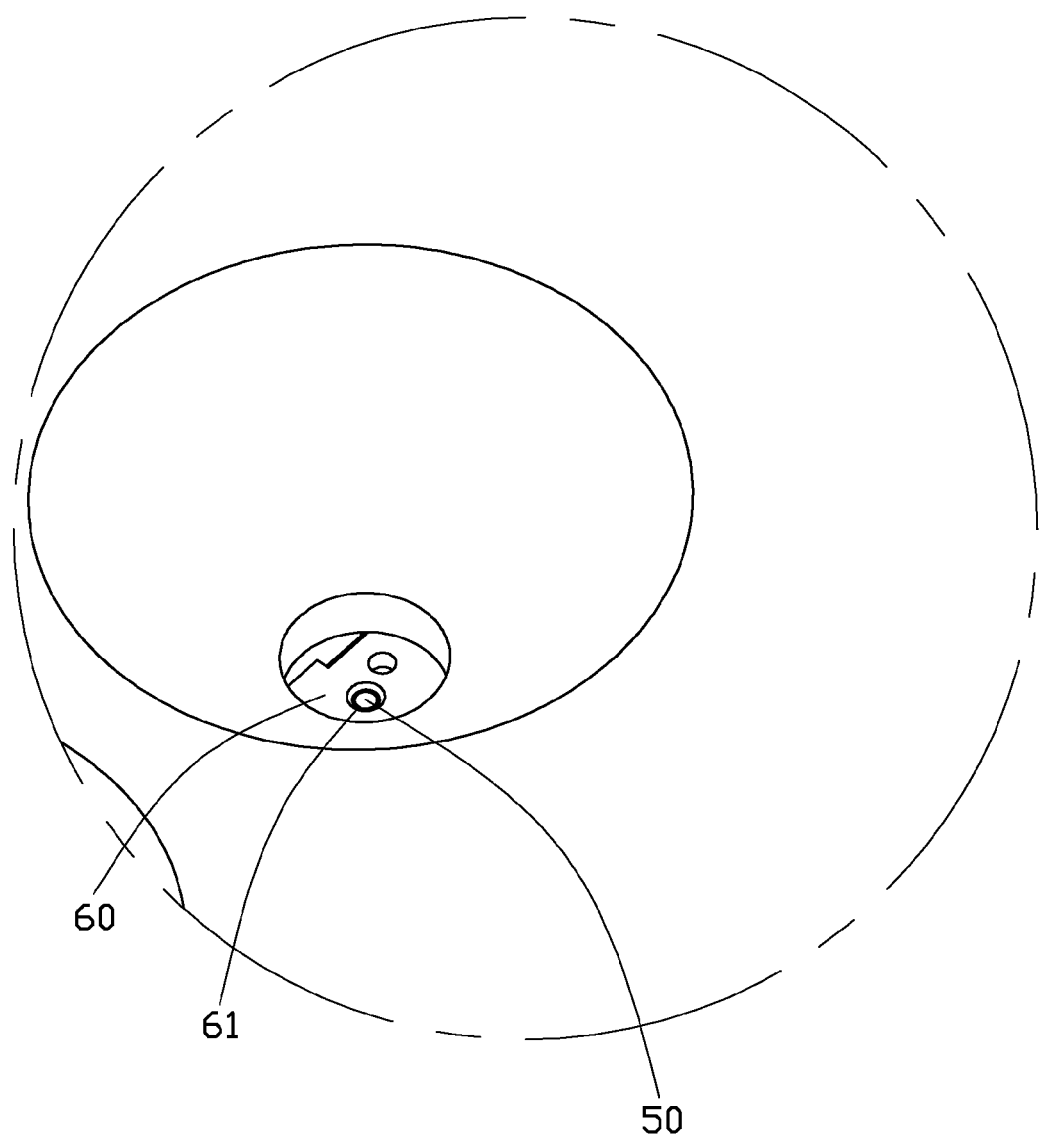
FIG. 10 is an enlarged view of a circular part X in FIG. 9.

The thickness of the frame 30 is larger than a sum of the thickness of guide pole receiving unit 20 and the thickness of the first bump 120, and each guide pole receiving unit 20 is received in the corresponding through hole 301 and stacked on the corresponding first bump 120. The first bump 120 and the guide pole receiving unit 20 have a substantially rectangular cross-section. Each first bump 120 includes a number of second fixing poles 121, and each guide pole receiving unit 20 further defines a number of first fixing holes 211. The second fixing pole 121 is engaged with the first fixing hole 211. The guide pole receiving unit 20 defines a second receiving hole 210 at a corner. The second receiving hole 210 is configured for receiving a guide pole 50 (shown in FIG. 7). The second receiving hole 210 extends through the guide pole receiving unit 20 and includes two conical opening portions and a circular cylinder potion interconnected between the two conical opening portions (shown in FIG. 3 and FIG. 4). The second receiving hole 210 can be designed to different sizes according to the size of the guide pole 50. So the guide pole receiving unit 20 is changeable according to the size of the guide pole 50.

The cover 40 is mounted on the frame 30 and includes a top surface 403 and a bottom surface 404 opposite to the top surface 403. The top surface 403 defines a number of dispensing holes 402. The dispensing hole 402 extends through the cover 40. The dispensing hole 402 corresponds aligned with the corresponding second receiving holes 210 and the second receiving hole 210 being exposed through the dispensing holes 402. The dispensing hole 402 includes a second conical opening 4021 and a second cylindrical portion 4022 connected with the second the conical opening 4021 (shown in FIG. 2). The bottom surface 404 of the cover 40 has a number of second bumps 4041. The second bumps 4041 correspond to the dispensing hole 402. The bottom surface 404 of the cover 40 includes a number of third fixing poles 401. The cover 40 is fixed with the frame 30 through engaging the third fixing pole 401 in the first fixing hole 302. A pre-determined spacing 4042 (shown in FIG. 5) is defined between the cover 40 and the guide pole receiving unit 20. The pre-determined spacing 4042 is configured for receiving an image sensor plate 60 (shown in FIG. 7).

FIGS. 7-10 show an assembling method using the assembling device 100. The assembling method includes the following steps.

Step S1: an assembling device 100, a number of guide poles 50 and a number of image sensor plates 60 are provided. The guide pole 50 is made of metal, such us iron, cobalt, nickel and other metals that can be magnetized by the magnet 110. A height of the guide pole 50 is larger than a thickness of the guide pole receiving unit 20. The image sensor plate 60 includes a bearing hole 61 configured for receiving one end of the guide pole 50.

Step S2: the cover 40 is removed from the frame 30.

Step S3: the guide pole 50 is put into the second receiving hole 210 and is exposed at a pre-determined thickness from the second receiving hole. The pre-determined thickness is a thickness of the image sensor plate 60. The guide pole 50 is kept a vertical state in the second receiving hole 210 because of being attracted by the magnet 112.

Step S4: the image sensor plate 60 is put on the guide pole receiving unit 20 and the guide pole 50 is inserted into the bearing hole 61.

Step S5: the cover 40 covers the frame 30. The image sensor plate 60 is located in the pre-spacing 4042 formed between the second bump 4041 and the guide pole receiving unit 20, and the bearing hole 61 is exposed from the dispensing hole 402.

Step S5: bonding material, such as glue or adhesive is dispersed into the dispensing hole 402, the bonding material flows to the bearing hole 61, and the bonding material is cured. In this way, the guide pole 50 is fixed with the image sensor plate 60. By using the assembling device 100 in this disclosure, the guide pole 50 is kept a vertical state in the second receiving hole 210. Therefore, the guide pole 50 is perpendicular to the image sensor plate 60 during an assembling process.

It is to be understood, however, that even though numerous characteristics and advantages of the present embodiments have been set forth in the foregoing description, together with details of the structures and functions of the embodiments, the disclosure is illustrative only, and changes may be made in detail, especially in the matters of shape, size, and arrangement of portion within the principles of the disclosure to the full extent indicated by the broad general meaning of the terms in which the appended claims are expressed.

What is claimed is:

1. An assembling device for a guide pole of a camera actuator comprising:
    a pedestal comprising a first surface and a second surface opposite to the first surface, the first surface defining a plurality of first receiving holes, a magnet received in each the first receiving hole, the second surface defining a plurality of first bumps spatially corresponding with the respective first receiving holes;
    a frame mounted on the second surface, the frame defining a plurality of through holes, each through hole spatially corresponding to the first bump and the first bump is received in the corresponding through hole;
    a plurality of guide pole receiving units, each guide pole receiving unit defining a second receiving hole configuring for receiving a guide pole, each guide pole receiving unit being received in the corresponding through hole and stacked on the corresponding first bump;
    a cover mounting on the frame, comprising a top surface and a bottom surface opposite to the first surface, the top surface of the cover defining a plurality of dispensing holes, the dispensing hole extending through the cover, the dispensing holes aligned with the corresponding second receiving holes and the second receiving hole being exposed through the dispensing holes.

2. The assembling device of claim 1, wherein the first receiving hole is a blind hole and the first receiving hole comprises a first cylindrical portion and a first conical opening connecting with the first cylindrical portion.

3. The assembling device of claim 2, wherein the first conical opening tapers from the first surface to the second surface.

4. The assembling device of claim 1, wherein both the first bump and the guide pole receiving unit have a substantially rectangular cross-section.

5. The assembling device of claim 1, wherein the second surface of the pedestal further comprises a plurality of first fixing poles at the edges of the second surface, the frame comprises a plurality of first fixing holes, the frame is fixed with the pedestal through engaging the second fixing poles in the second fixing holes.

6. The assembling device of claim 5, wherein the bottom surface of the cover comprises a plurality of third fixing poles, the cover is fixed with the frame through engaging the third fixing poles in the second fixing holes.

7. The assembling device of claim 1, wherein each of the first bump comprises a plurality of second fixing poles, and each of the guide pole receiving unit further comprises a plurality of second fixing holes, the second fixing pole is engaged with the second fixing hole.

8. The assembling device of claim 1, wherein the frame comprises a first side surface and a second side surface opposite to the first side surface, the first surface comprises a first recess and the second side surface comprises a second recess.

9. The assembling device of claim 1, wherein the thickness of the frame is larger than a sum of the thickness of the guide pole receiving unit and the thickness of the first bump.

10. The assembling device of claim 1, wherein the bottom surface of the cover defines a plurality of second bumps, and the second bumps are aligned with the respective dispensing holes.

11. The assembling device of claim 1, wherein each dispensing hole comprises a second conical opening and a second cylindrical portion connecting with the second conical opening.

12. The assembling device of claim 10, wherein a pre-determined spacing is defined between the second bump and the guide pole receiving unit, the pre-determined spacing is configured for receiving an image sensor plate.

* * * * *